United States Patent Office 3,437,808
Patented Apr. 8, 1969

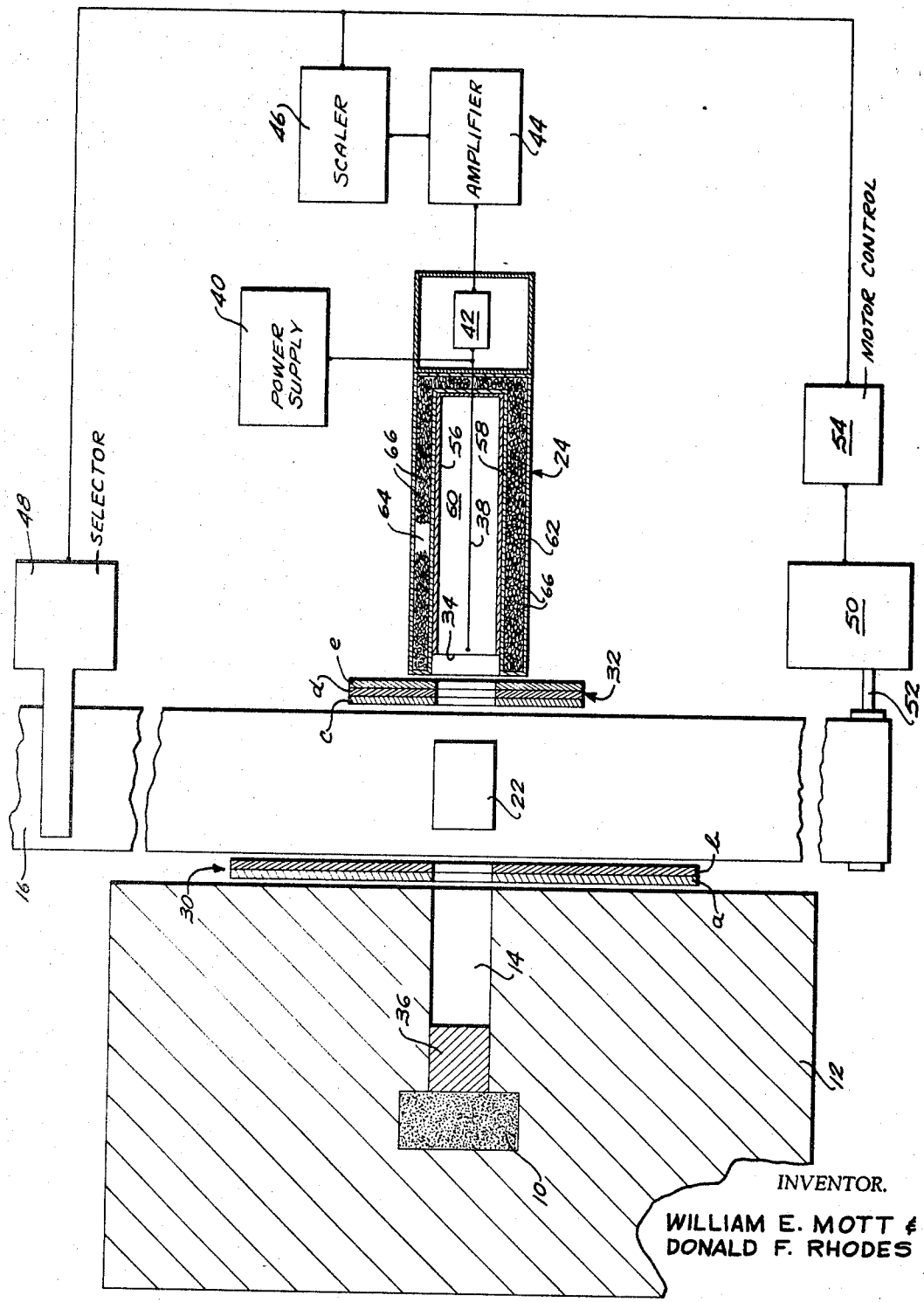

3,437,808
QUALITY CONTROL BY NEUTRON TRANSMISSION
William E. Mott, O'Hara Township, Allegheny County, and Donald F. Rhodes, Plum Borough, Pa., assignors to Gulf Research & Development Company, Pittsburgh, Pa., a corporation of Delaware
Filed July 6, 1965, Ser. No. 469,659
Int. Cl. G01t 3/00; H01j 39/32; B07c 5/344
U.S. Cl. 250—83.1                                17 Claims

ABSTRACT OF THE DISCLOSURE

The presence of a treating material in a workpiece can be determined by a neutron transmission method of quality control. Thus a beam of thermal neutrons is directed at a workpiece and parallel neutrons passing therethrough are detected. A neutron count above a predetermined level causes the workpiece to be rejected.

---

This invention relates generally to a method and apparatus for determining the presence of a material in an object intended to be treated with that material. In particular this invention concerns a method and apparatus for detecting the presence of a hydrogen-containing material, such as lubricating grease or oil, in an object intended to be treated with that material.

The nature of industrial methods of continuous mass processing of raw materials and mass production of mutually interchangeable replacement parts for apparatus necessitates the development of methods and means for quality control of industrial products. It is desirable, and often imperative, that the mode of quality control employed be both continuous and automatic in operation and that the mode of quality control have a degree of reliability such that it is virtually infallible. Examples of such situations arise in the treatment of naturally occurring raw materials with refined petroleum products to render the raw materials suitable for agricultural and industrial use and in the manufacture of lubricated parts for all types of machinery and laboratory instruments. A more specific example of a situation requiring continuous automatic quality control that is completely reliable occurs in the manufacture of greased bearings and other lubricated parts for automobile transmission units. In such instances, the quality control process often is complicated by the fact that the finished product is sealed and cannot be inspected visually.

There have been suggested many diverse methods and types of apparatus for the determination of the presence of a treating material in or on a processed or manufactured article. Visual inspection by a human operator has been attempted where it is applicable and has often been found unsatisfactory because fatigue and distraction of the operator result in the undetected passage of a certain quantity of improperly treated articles through the testing or quality control stage of the process involved. The recent application of the technology of nucleonics to industrial processing has resulted in development of various apparatus adapted to detect the presence of a particular material in an article or workpiece. In particular, there have been developed apparatus that measure some of the neutrons that are moderated or thermalized in a processed article that is bombarded by neutrons. The use of such apparatus has been suggested, for example, to employ the thermalization of neutrons by the object tested to determine the moisture content in foundry sand or to determine the relative proportions of various constituents of product streams in petroleum refineries.

As background information to aid in understanding the operation of neutron detection methods and apparatus, it should be noted that, when an article or workpiece is bombarded with neutrons, a number of distinct events can occur. Some of the neutrons interact with nuclei of the various chemical elements present in the article or workpiece. Those interacting neutrons are either absorbed by the nuclei they contact or are deflected and scattered by the nuclei and thereafter pass out of the workpiece or enter into one or more interactions with other nuclei present. Still other neutrons pass through the article or workpiece without interacting with any of the nuclei and thereby travel a straight, uninterrupted path of flight through the workpiece. The interaction of a particular neutron with a nucleus in the workpiece is a complex physical phenomenon that cannot be accurately predicted by purely theoretical analytical methods and, therefore, the prediction or manipulation of neutron interactions must be determined empirically and based on statistical principles and methods.

Although present methods of analyzing neutron interaction are fundamentally statistical, it is known that the probability of a neutron interacting with an atomic nucleus depends upon the energy of the neutron and the composition and structure of the nucleus. Ordinarily, the effective area of a nucleus available for interaction with neutrons passing near the atom is larger than the actual physical area of the nucleus. Such effective area of a nucleus is referred to as the scattering cross section and is defined in units of barns having the dimensions of length squared. By definition, one barn is equal to $1 \times 10^{-24}$ centimeter squared. The scattering cross section characteristic of a particular chemical element varies with the energy of neutrons passing through a material containing that element. For example, for neutrons having energies within the range of from 100 to 0.01 million electron volts, the scattering cross section of the hydrogen nucleus varies from 0.1 barn to approximately 20 barns. In the neutron energy range from 0.01 million electron volts to near the region of 1.0 electron volt, the hydrogen scattering cross section remains constant at approximately 20 barns; then, as the neutron energy decreases further, the hydrogen scattering cross section increases to approximately 80 barns at 0.003 electron volts. The variation in scattering cross section with a variation in neutron energy also occurs for elements other than hydrogen. However, the variation in scattering cross section and the numerical value or magnitude of the scattering cross section generally are not as great for most other elements as they are for hydrogen at certain levels of neutron energy.

The use of neutron detection methods and apparatus to determine the presence of a particular element, and thus of a treating material containing that element, in a workpiece is based upon the nature of neutron interactions as discussed above, and the neutron detection methods and apparatus presently available are subject to certain disadvantages. For example, because the detecting element is of relatively small size, the detector measures only a part of the neutrons actually scattered by the workpiece. Furthermore it is often impracticable to locate the detecting element in the most desirable region for reutron measurements because the neutron detection apparatus is incorporated with other apparatus employed in the industrial process. Because neutron detection methods and apparatus generally do not provide for detection of substantially all scattered neutrons, such methods and apparatus often fail to provide the high degree of reliability that is usually required in industrial quality control processes.

Other disadvantages inherent in the use of heretofore available methods and apparatus for neutron detection n industrial processes arise because generally the neutron source, the detector, and the path of neutrons to the workpiece or test object are not properly isolated and shielded from each other and from the testing environment. In the development of the method and apparatus of this invention, it has been found that, when the neutron source and detector are not properly shielded and isolated by materials that are capable of absorbing neutrons to provide a well-defined path of neutron flight through the test object from the source to the detector, the measurement of neutron interaction is likely to be unreliable, inaccurate and imprecise. Such unreliability arises, at least partly, from the effect of neutrons from sources extraneous to the testing apparatus that enter the detector and are counted, erroneously, as neutrons emanating from the workpiece. Furthermore, improperly shielded and open, unisolated apparatus often provide fields of incident and scattered neutrons having intensities that vary excessively in space with time. Such disadvantages cause a degree of unreliability that is generally intolerable in industrial processes requiring rather strict quality standards.

This invention resides in a method and apparatus for quality control in industrial processes whereby the presence or absence of a treating material in a workpiece is determined by measurement of the intensity of a neutron beam transmitted through that workpiece. A preferred embodiment of the method of this invention comprises passing a beam of neutrons from a source to a detector, collimating the neutron beam between the source and detector, moderating neutrons around the source and shielding the detector with materials capable of absorbing neutrons, thereby providing a well-defined path of neutron flight and a testing zone between the source and the detector, measuring the number of neutrons transmitted through a properly treated workpiece in the testing zone, measuring the number of neutrons transmitted through a workpiece in the testing zone that is substantially devoid of the treating material, positioning in the testing zone a workpiece to be tested, measuring the transmission of neutrons through that workpiece, comparing the measurement of transmitted neutrons for the tested workpiece to the measurements obtained for the properly treated workpiece and for the workpiece substantialy devoid of treating material, and rejecting those tested workpieces that produce a count of transmitted neutrons that is greater than a predetermined allowable maximum count of transmitted neutrons determined from the count of neutrons transmitted through the properly treated workpiece and through the workpiece substantially devoid of treating material.

The apparatus of this invention comprises a neutron source and a neutron detector substantially axially aligned with each other on opposite sides of supporting means constructed and arranged to hold a workpiece to be tested. The source is substantially surrounded with neutron moderating material that has a neutron conduit therein extending from the source to the support means toward the detector. In a preferred embodiment of the apparatus, a plug of neutron moderating material is inserted in the conduit between the source and the support means; the detector has a covering of neutron shielding material; and neutron collimating means are positioned between the source and detector. In a highly preferred embodiment of the apparatus of this invention, the support means comprises a continuous conveyor means such as a belt or rollers; data conversion means are combined with the detector to convert the output signal of the detector to intelligible data; and quality control means are also combined with the detector to receive the output signal therefrom and to remove automatically from the conveyor means any workpiece that fails to conform to a predetermined quality standard.

The accompanying drawing comprises a diagrammatic plan view, in cross section, of apparatus suitable for use with the method of this invention.

As used hereinafter with reference to this invention, the following words and phrases are intended to have the meanings and definitions listed below:

"Workpiece" denotes any object or aggregate, whether man-made or natural that is subjected to a method of treatment, manufacture, assemblage, or processing, as those terms are generally understood;

"Transmitted neutrons" are those which pass substantially directly through an object or workpiece without interacting with atomic nuclei contained in the object or workpiece;

The "neutron count" is the total number of neutrons detected in a particular interval of time and comprises the sum of two measured quantities referred to herein as "signal" and "noise";

"Signal" denotes that portion of the neutron count that is responsive to the number of transmitted neutrons entering the detecting means employed;

"Noise" denotes that portion of the neutron count that is responsive to the number of non-transmitted neutrons entering the detecting means by any path other than a path of transmission substantially directly through the workpiece; therefore, the noise sensed by the detecting means includes not only those neutrons involved in interaction with atomic nuclei in the workpiece and which subsequently enter the detecting means, but also includes those neutrons that enter the detecting means from sources extraneous to the apparatus used with the process of this invention;

The "counting time" is a continuous period of time during which the number of neutrons entering the detecting means is measured thereby;

"Neutron shielding material" is any material having a relatively great capability for absorbing neutrons;

"Neutron moderating material" is any material having a realtively great capacity for thermalizing and scattering neutrons;

"Fast neutrons" are those neutrons having an energy greater than about one electron volt;

"Thermal neutrons," or "slow neutrons," are those having an energy of about one electron volt or less; and A "thermal neutron distribution" is a group of neutrons in which a substantial number of the neutrons have energies equal to or less than about one electron volt.

In accordance with the method of this invention, the presence of a treating material in a workpiece is determined by measuring the transmitted neutron count in a fixed counting time for a workpiece positioned in a beam of neutrons that are passed from a neutron source to a neutron detector. The source and detector are positioned in axial alignment with each other on opposite sides of the workpiece. The measurement of transmitted neutrons has an advantage compared to the measurement of non-transmitted neutrons in that a beam of transmitted neutrons is susceptible to control of the beam geometry by collimation of the beam and shielding. Thus, substantially the entire number of transmitted neutrons can be measured readily with consequent greater reliability and reproducibility than is attainable with non-transmitted neutron measurements.

The neutron source can be any means capable of emitting neutrons such as a nuclear reactor, a cyclotron, a neutron accelerator, or a radioactive source material containing a mixture of substances, at least one of which is radioactive. The radioactive source materials are preferred for use with this invention because of the stability of the rate of neutron emission from such materials and because of their compactness and ease of handling. Examples of suitable radioactive source materials are a mixture of polonium and beryllium which has a half life of 138 days and a rate of emission of $2.5 \times 10^6$ neutrons per curie per second and a mixture of radium and beryllium which has a half life of 1,622 years and a rate of emission of $1.3 \times 10^7$ neutrons per curie per second. The number of neutrons emitted in a given time period from a radioactive source material is a statistical phenomenon, and it is desirable that the radioactive source material be capable of providing a relatively high rate of neutron emission that is substantially constant for long periods of time, and at least during the counting time employed. Therefore a preferred radioactive source material is a mixture of plutonium 239 and beryllium which has a half life of 24,600 years and a rate of neutron emission of $1.7 \times 10^6$ neutrons per curie per second. Another preferred radioactive source material is a mixture of americium and beryllium which has a half life of 458 yeas and a rate of neutron emission of $2.0 \times 10^6$ neutrons per curie per second. In any event, the particular neutron source employed does not constitute a critical element of this invention as long as the source is capable of providing a substantially constant rate of emission that provides a number of neutrons in the beam adequate to assure a high enough probability of neutron interaction in the workpiece to afford a reliable and accurate indication of the presence or absence of the treating material. A suitable rate of neutron emission from the source has been found to be one that is equal to at least about $1.0 \times 10^6$ neutrons per second. Thus with a mixture of plutonium 239 and beryllium, for example, it is desirable that at least about 0.5 curie of the radioactive source material be employed.

The neutron detecting means used with this invention can comprise a detector that can be combined with electronic amplification means to amplify the output responses produced by the detector and a scaler or other recording means capable of producing a visual record of the neutron count. In conjunction with, or in lieu of, the scaler, the detector can be combined with an automatic workpiece selecting device that responds to the output signal of the detector to reject or remove defective workpieces. The neutron detector can be a counter that is lined with boron or lithium or a proportional counter that is filled with gaseous boron trifluoride or the isotope of helium having an atomic mass of three. Any detecting means capable of detecting thermal neutrons and of producing an intelligible output record is suitable for use with the process of this invention.

It is important to the effective use of the method of this invention that the neutron count represent only transmitted neutrons to the extent that such a limitation is attainable by reasonably practicable means. Because the neutron detectors that have been available heretofore are not selective in the measurement of transmitted neutrons to the exclusion of non-transmitted neutrons, additional manipulative steps comprising a preferred form of the method of this invention are adapted to reduce the detected noise that results from entry of non-transmitted neutrons into the detector. The reduction of detected noise is accomplished according to a preferred form of this invention by collimating the neutron beam and by shielding the area around the testing zone and the detector.

The assurance of a well-defined beam of neutrons that is directed toward the workpiece and the reduction of the number of stray neutrons around the test zone and detector are attained, in part, by substantially surrounding the source with moderating material such as paraffin, polystyrene, graphite, oil, heavy water, cadmium, Boral, or a combination of such materials. A neutron conduit or flight path to the workpiece is provided by forming a passage extending from the source to the workpiece through the block of moderating material around the source. The shape and dimensions of the neutron conduit desirably are constructed and arranged to conform substantially to the shape and dimensions of the workpiece where possible to reduce the number of neutrons from the source that by-pass the workpiece and enter the detector.

Neutrons entering the detector from sources extraneous to the apparatus emloyed are troublesome because they can be counted erroneously as transmitted neutrons. To reduce the number of non-transmitted neutrons entering the detector through the walls of the detector, additional shielding can be provided in the form of a jacket of shielding material around the detector. Such a shielding jacket preferably is made of a metal such as cadmium or Boral, but other materials or combinations of materials can be used.

Another source of non-transmitted neutrons are those that are scattered by the workpiece or other objects in and around the test zone and, after one or more interactions with nuclei, still enter the detector through the walls thereof or by way of the detector entry; therefore, further reduction of noise and improvement of the detected signal is obtained by collimating the neutrons emitted by the source. Preferably, the neutron beam is collimated at least twice; once between the source and the workpiece to direct substantially parallel streams of neutrons into the workpiece, and once between the workpiece and the detector to reduce further the number of non-transmitted neutrons entering the detector. It should be noted here that the shape and dimensions of the neutron passages through the collimating means are governed by one or both of two factors. One factor is the shape and dimensions of the workpiece; in relation to which the neutron passages should have a shape and dimensions constructed and arranged to prevent entry into the detector of neutrons that by-pass the workpiece without travelling therethrough. The other factor affecting the form and dimensions of the neutron passages through the collimating means is the size and shape of the entry to the detector. All other neutron passages should be constructed and arranged, whenever practicable, to conduct substantially parallel streams of transmitted neutrons into the detector while absorbing all other neutrons to prevent their entry into the detector.

Many neutron sources produce neutrons having energies within a wide range of energies, and this is true of the radioactive source materials discussed above. Thus, regardless of the source employed, there are almost certain to be emitted a number of fast neutrons as well as a number of slow neutrons. The nature of neutron production by a source is important to the effective use of the process of this invention for at least two reasons. Compared to thermal neutrons, fast neutrons have considerably less probability of interacting with the nuclei of a particular element in the workpiece. In addition, most of the presently available and commonly employed neutron detectors are capable of detecting only thermal neutrons, and fast neutrons enter such detectors without contributing to the output signal from the detector. A preferred embodiment of the method of this invention has, as an additional improvement, the step comprising further moderation of the neutrons emitted by the source into the conduit before their entry into the workpiece. Suitable methods of such additional moderating of the source neutrons comprise either surrounding the source completely with moderating material or interposing in the conduit between the source and the workpiece a plug of material capable of scattering and thermalizing neutrons. Then the beam of neutrons leaving the moderating material comprises substantially a thermal distribution of neutrons characterized by a high probability of interaction in a properly treated workpiece and by the production of a transmitted neutron beam that accurately and reliably indicates the presence or absence of treating material in the workpiece.

Examples of suitable moderating materials to form the plug are the same materials as are suitable to form the moderating block, such as paraffin, polystyrene, graphite, oil and heavy water. The solid state moderating materials are preferred because their physical state is more conveniently incorporated in apparatus suitable for use with the method of this invention. The moderating plug can have any shape and dimensions as long as it fits substantially within the neutron conduit in the moderating block and as long as it does not reduce the intensity of the neutron beam incident on the workpiece to such a level that a reliable representation of the presence or absence of the treating material cannot be obtained. Satisfactory application of the method of this invention has been obtained in instances where the moderating plug has been omitted entirely as well as in instances in which the moderating plugs had lengths of from one inch to several inches and a cross-sectional area substantially equal to the cross-sectional area of the neutron conduit.

Another factor influencing the effective use of the process of this invention is the counting time employed. It is preferred that equal counting times be employed for each workpiece tested as well as for the measurements made for the properly treated workpiece and for the workpiece devoid of treating material. If equal counting times are used, the comparison of measurements can be made directly. However, if unequal counting times are used for any reason, they can be adjusted for comparison by calculating, for each workpiece tested, an average transmitted neutron count for a fixed unit time period that is the same for each measurement and comparing those values, or equivalent multiples of each of those values, for each workpiece tested.

Because this invention is generally adapted for use with industrial or laboratory processes in which a large number of workpieces are to be tested in a relatively short time, it is often desirable to employ a counting time less than one minute in duration, and often less than ten seconds in duration. Our investigations, and the data presented below, indicate that the method and apparatus of this invention can be used to indicate reliably the presence of a treating material in a workpiece when the counting time is less than ten seconds and can be used reliably even at counting times as short as three seconds or one second. Of course, longer counting times can be used when desired.

This invention can be used to test individual workpieces at the operator's discretion or it can be used to test a large number of workpieces, one after another, as would be required with workpieces transported through the testing zone on a conveyor belt or similar apparatus. To obtain a representative and reliable count of transmitted neutrons, one must balance many interrelated variables involved in the use of this invention such as the size and nature of the workpiece to be tested; the nature and amount of the treating material; the nature and strength of the source; the shielding, collimating, and moderating means employed; the space available to contain the testing apparatus, and the amount of counting time available in conjunction with the industrial process involved. Considering all of the factors involved, it is possible in most instances to obtain a reliable measurement for presence of the treating material as the workpiece moves continuously through the testing zone. Calibration tests of the equipment involved in each practical application of this invention will indicate the necessity for, and nature of, the required adjustments to render the invention suitable to its particular purpose. If in some instances it is necessary to hold the workpiece stationary in the testing zone during the counting time, means can be employed to regulate the movement of the workpiece through the testing zone in that, or in any other, required fashion. In any event, actual practical application of this invention in a particular instance will undoubtedly require some modifications according to the dictates of the experience of one skilled in the art; however, such modifications will not effect a departure from the scope of this invention as long as they involve a method of measuring the transmission of moderated neutrons through a workpiece while shielding and collimating the neutron beam and employing the measurements obtained to effect quality control of the workpiece tested based upon standards derived from calibration data obtained from carefully prepared standardized workpieces.

In the use of the process of this invention, the apparatus employed is arranged around the test zone with the orientation and spacing of the various parts adapted to provide incident and transmitted beams of neutrons of sufficient intensity to determine the presence of the treating material. The required spacing and orientation, and the minimum allowable counting time, can be determined from repeated calibration measurements for transmitted neutrons made with an empty testing zone, a known properly treated workpiece, and a workpiece substantially devoid of treating material. Our experience indicates that transmitted neutron measurements for a properly treated workpiece and for a workpiece devoid of treating material differ by an amount substantially greater than the combined statistical errors involved in those measurements, even for counting times as short as a few seconds, if the various related elements of the invention are properly controlled according to the operating conditions encountered. Thus a quality control standard, to be applied directly by a human operator or remotely and automatically by apparatus communicating with the detector, can be derived on a basis, for example, that a maximum allowable transmitted neutron count is 1.5 or 2.0 (or whatever figure is suitable) times the count obtained for the properly treated workpiece. Workpieces producing counts in excess of the maximum allowable count are rejected from the remainder of the industrial process involved.

In some instances, the workpiece contains materials that are in some respects similar to the treating material, such as when a workpiece lubricated with a petroleum derivative also contains a certain amount of moisture, and both the lubricant and the moisture contain hydrogen in approximately the same proportions. In such circumstances, additional calibration can be effected by obtaining measurements for a workpiece containing the lubricant but devoid of moisture and for a workpiece containing water but no lubricant, as well as for workpieces containing various proportions of water and lubricant. With such calibration data, the quality control standard can be derived and adjusted to fit the operating conditions of the particular industrial process involved.

An example of apparatus suitable for use with the method of this invention is shown in plan view and cross section in the accompanying drawing which, it should be noted, is not drawn to scale. The apparatus comprises a neutron source 10 surrounded by a moderating block 12 having a neutron conduit 14 extending from source 10 to the outer edge of moderating block 12. Source 10 and moderating block 12 are aligned adjacent support and conveyor means 16 adapted to support and transport a workpiece 22 through a testing zone defined by the arrangement of the apparatus employed. A neutron detector, indicated generally by reference numeral 24, is positioned at the side of conveyor means 16 remote from source 10 and in axial alignment with a line extending substantially through the center of source 10, conduit 14 and detector 24 to define a substantially straight flight path for neutrons through the apparatus.

The collimating means employed in this embodiment of the apparatus comprises a first set of neutron collimators, indicated generally by reference numeral 30, comprising collimators $a$ and $b$ that are interposed between workpiece 22 and the end of conduit 14 to absorb stray and scattered neutrons and to direct substantially parallel streams of incident neutrons toward workpiece 22. A second set of collimators, indicated generally by reference numeral 32, comprises collimators $c$, $d$, and $e$ that are interposed between workpiece 22 and the entry 34 of detector 24 to absorb stray and scattered neutrons and to direct substantially parallel streams of transmitted neutrons into detector 24. The collimators are made of a material having a relatively great capability for neutron absorption, such as cadmium or Boral. Each of collimators $a$, $b$, $c$, $d$ and $e$ also has a central passage therethrough which is axially aligned with source 10 and detector 24. The number of collimators employed in any set is determined by such factors as the space available and the amount of collimation required, if any.

As was indicated above, the dimensions of the central passages through the collimators, and of conduit 14 are preferably substantially equal to the size of workpiece 22 because of the desirability of minimizing the number of neutrons completely by-passing workpiece 22 and entering detector 24. Where that condition is satisfied or is not important to the effective use of this invention, the dimensions of the collimator passages and conduit 14 can, if desirable, be made substantially the same as the shape and size of entry 34 in detector 24 to provide an adequate number of transmitted neutrons entering detector 24 while tending to minimize the number of non-transmitted neutrons entering detector 24.

A moderating plug 36, comprising material the same as or similar to the material in moderating block 12 and having a relatively great capability of thermalizing neutrons, is enclosed in conduit 14 adjacent source 10 to provide a thermal neutron distribution incident on workpiece 22. In some instances, moderating plug 36 can be omitted and in any instance, the dimensions of the moderating plug are determined by such factors as the strength of the source, the size and nature of the workpiece, the nature of the treating material, the type of detector employed, and the counting time.

Detector 24 has a sensing element 38 that is connected to a high voltage power supply 40 and to preamplification means 42. Entry of a neutron into detector 24 results ultimately in a change of electrical potential along sensing element 38 which is transmitted to an amplifier 44 that is connected to preamplifier 42. A scaler 46 is connected to amplifier 44 and is adapted to convert the output signal of detector 24 into intelligible data. Scaler 46 is connected also to a selector 48 which operates to remove from conveyor means 16 any workpiece that does not produce a transmitted neutron count that is within the predetermined quality control standard. Selector 48 can have incorporated therewith a time delay actuating apparatus (not specifically shown in the drawing) that delays the actuation of selector 48 until a substandard workpiece has passed from the testing zone to the place where the workpiece can be removed by selector 48.

A motor 50, or other prime mover, is connected through shaft 52, or other drive means, to conveyor means 16. Control of the speed, and intermittent or periodic stopping, of conveyor means 16 can be effected by manual or automatic control of motor 50 or drive means 52. In the alternative, a motor control 54 can be connected to scaler 46 to receive the amplified output signal of detector 24 and control the movement of conveyor means 16 and workpiece 22 in conjunction with the signal from detector 24. For example, motor control 54 can be adapted to halt each workpiece 22 in axial alignment with source 10 and detector 24 for a time equal to the counting time. Then as the workpiece moves out of alignment there is an increase in the neutron count detected that reaches a maximum between successive workpieces. After that maximum count is detected, the construction and arrangement of motor control 54 allows sufficient additional movement of conveyor means 16 to align the next workpiece with the common axis through the source and the detector. Then the movement of conveyor means 16 and the workpiece is halted by motor control 54 for another period equal to the counting time.

Many modifications of the apparatus described herein can be effected without departing from the scope of this invention which includes means to measure a beam of moderated neutrons incident on and transmitted through a workpiece wherein the beam is preferably collimated, and wherein, desirably, the detected neutron measurement is adapted by additional apparatus to the quality control of workpieces passing through the neutron measurement apparatus. In a specific embodiment of the apparatus described in general terms above, source 10 consists of ten curies of a mixture of plutonium 239 and beryllium and moderating block 12 is made of paraffin. Conduit 14 is a two-inch by one-half inch rectangular passage having a length of five inches from the edge of source 10 facing the workpiece to the outer surface of moderating block 12. Moderating plug 36 is made of paraffin, two inches by one-half inch in cross-section and two inches long, contiguous to source 10.

In the specific embodiment discussed here, the workpiece is a greased automotive transmission bearing that is about two inches in diameter and about three-quarter inch high. The first set of collimators 30 are two Boral plates having slots therein with dimensions of two inches by one-quarter inch, substantially equivalent to those of the bearing. The second set of collimators 32 comprises three Boral plates with a cumulative thickness of one and one-half inches and passages therethrough having dimensions of two inches by one-half inch.

The detector 24 used in this specific embodiment comprises a proportional counter filled with boron trifluoride gas and having an entry 34 having a nominal diameter of two inches. Detector 24 comprises an inner stainless steel liner 56 covered with a cadmium sleeve 58. Steel liner 56 forms a chamber 60 containing the gaseous boron trifluoride. An outer aluminum casing 62 forms an annular chamber 64 around cadmium sleeve 58. Chamber 64 is filled with boron carbide chips 66 which, in combination with cadmium sleeve 58, function to absorb neutrons and reduce the number of non-transmitted neutrons entering detector 24.

Using the method of this invention and apparatus similar to that of the specific embodiment described above, determinations were made of the presence or absence of a grease derived from petroleum in automobile transmission bearings. In one series of tests, the counting time was fixed at one minute, and the number of neutrons counted with no bearing in the testing zone was 16,500 counts per minute. The neutron count for a greased bearing was 1,640 counts per minute, and the count for an ungreased bearing was 4,820 counts per minute, or approximately three times as large as the count for the greased bearing. In another series of tests, using a three-second counting time, counts were approximately 60 for greased bearings and approximately 170 for ungreased bearings, or approximately three times greater for ungreased bearings. Based on such data, the quality control criterion was set that, with three second counting time, any bearing producing a neutron count greater than approximately 120 should be rejected.

Although the use of the method and apparatus of this invention has been described in detail with respect to the determination of the presence, in automobile transmission bearings, of a lubricant containing hydrogen, it is not intended that use of the invention be restricted to such instances. The invention disclosed herein can be used to determine the presence or absence of many materials in virtually any object or matrix. For neutron energies within the thermal range, many elements have a relatively large total cross section resulting from a combination of the absorption and scattering cross sections. For example, approximate total thermal cross sections, in barns, are 48 for chlorine, 44 for cobalt, 2,557 for cadmium, 192 for indium, 24 for tungsten, 107 for gold and 400 for mercury. In general, any element having a high cross section can be determined if it is in a matrix or on a material that has a relatively lower cross section. Thus, this invention can be used to determine the presence of cadmium in alloys with lead, bismuth and tin; the presence of gold plating on a base material; and the presence of indium in tin. Such practical applications of this invention are presented by way of example only and are not intended to limit the scope of the invention. By the application of technological experience and acumen, one skilled in the art can, in a given instance, readily determine the modification necessary to adapt this invention to other qualitative and quantitative determinations without departing from the scope and spirit of the inventive concept herein disclosed.

The preceding discussion describes a novel and improved method and apparatus for employing a measurement of neutron transmission through a workpiece to determine the presence or absence of a treating material in the workpiece and to control the quality of finished workpieces. The description of any particular element of the method or apparatus of the invention is not intended to limit the scope of this invention in any manner other than is indicated by the limitations recited in the accompanying claims.

Therefore we claim:

1. Apparatus for determining the presence of a treating material in a workpiece, said apparatus comprising support means for said workpiece, a neutron source laterally spaced from one side of said support means and aligned with the supporting surface of said support means, a neutron detector positioned adjacent the side of said support means remote from the source in axial alignment with the source, a block of moderating material substantially surrounding the source that is capable of thermalizing and scattering neutrons, a neutron conduit extending through the moderating block from the source to the workpiece support means in alignment with the source and the detector, a first set of neutron collimators secured adjacent the end of the neutron conduit nearest the support means, a second set of neutron collimators secured between the workpiece and the entry of the detector, each of said collimators of said first and second sets of collimators constructed of a material that is capable of absorbing neutrons, and each collimator having an opening therethrough that is aligned with a common axis passing through the source and the detector, said opening having dimensions that are substantially the same as the dimensions of the workpiece.

2. Apparatus as described in claim 1 having a neutron moderating plug enclosed adjacent the source within the neutron conduit, said plug constructed of material capable of thermalizing and scattering neutrons.

3. Apparatus as described in claim 1 wherein the moderating block comprises paraffin.

4. Apparatus as described in claim 1 wherein the moderating block comprises polystyrene.

5. Apparatus as described in claim 1 wherein the moderating block comprises a tank of oil.

6. Apparatus as described in claim 1 wherein the detector comprises a proportional counter containing gaseous boron trifluoride.

7. Apparatus as described in claim 1 wherein the detector has a jacket constructed of a material having an unusually high capability of absorbing neutrons.

8. An apparatus for measuring transmitted neutrons which comprises, in combination
   (a) thermal neutron means for providing a thermal neutron distribution to a workpiece,
   (b) neutron detecting means spaced from said thermal neutron means,
   (c) a workpiece between the thermal neutron means and the detecting means and located in the path of the thermal neutrons, and
   (d) collimating means between the workpiece and the detecting means for directing a substantially parallel beam of transmitted neutrons from the workpiece to the detecting means.

9. An apparatus according to claim 8 in which the thermal neutron means comprises a neutron source having neutron moderating means between the source and the workpiece.

10. An apparatus according to claim 8 in which the workpiece is supported upon moveable means for bringing a succession of workpieces into the path of the thermal neutrons.

11. An apparatus according to claim 10 in which the movement of the moveable means is controlled by the neutron detecting means.

12. An apparatus according to claim 8 in which the collimating means is fabricated from neutron shielding material and is provided with a central opening of substantially the same dimensions as the workpiece.

13. An apparatus according to claim 8 in which collimating means are provided between the thermal neutron distribution means and the workpiece for directing a substantially parallel beam of neutrons to the workpiece.

14. An apparatus according to claim 13 in which the collimating means is fabricated of neutron shielding material and is provided with a central opening of substantially the same dimensions as the workpiece.

15. An apparatus for quality control which comprises in combination
   (a) a source of thermal neutrons,
   (b) neutron detecting means spaced from the source and axially aligned therewith,
   (c) moveable support means between the source and the detecting means for placing a workpiece in the path of neutrons emitted from the source,
   (d) collimating means between the source and the workpiece for directing a beam of substantially parallel neutrons for the workpiece,
   (e) collimating means between the workpiece and the detecting means for directing a beam of substantially parallel transmitted neutrons from the workpiece to the detecting means, and
   (f) workpiece control means communicating with the moveable support means and the detector for moving a succession of workpieces into the neutron path.

16. An apparatus according to claim 15 in which data conversion means are provided in combination with the detecting means for converting the response of the detecting means into intelligible data.

17. An apparatus according to claim 15 in which quality control means are provided in combination with the detecting means for rejecting those workpieces for which the response of the detecting means fails to reach a predetermined level.

References Cited

UNITED STATES PATENTS

| | | | |
|---|---|---|---|
| 2,707,555 | 5/1955 | Gaudin | 250—83.1 X |
| 2,750,144 | 6/1956 | Beckwith | 250—83.1 X |
| 3,009,062 | 11/1961 | Brooksbank et al. | 250—83.1 |
| 3,126,481 | 3/1964 | Whittier | 250—83.1 |
| 3,237,009 | 2/1966 | Warman et al. | 250—83.1 |

ARCHIE R. BORCHELT, *Primary Examiner.*

U.S. Cl. X.R.

209—111.5; 250—43.5, 105